United States Patent [19]

Solomon

[11] 4,273,650
[45] Jun. 16, 1981

[54] APPARATUS AND METHOD FOR RECOVERING POLLUTANT LIQUIDS

[75] Inventor: Harold W. Solomon, Nashua, N.H.

[73] Assignee: Emtek Incorporated, Amherst, N.H.

[21] Appl. No.: 111,012

[22] Filed: Jan. 10, 1979

[51] Int. Cl.³ .......................................... E02B 15/08
[52] U.S. Cl. .................................. 210/104; 210/109; 210/923
[58] Field of Search .................. 210/97, 98, 84, 86, 210/104, 109, DIG. 25

[56] References Cited

U.S. PATENT DOCUMENTS

| | | | |
|---|---|---|---|
| 3,635,342 | 1/1972 | Mourlon et al. | 210/DIG. 25 |
| 3,719,936 | 3/1973 | Daniels | 340/236 |
| 3,756,409 | 9/1973 | Carmichael | 210/109 X |
| 4,031,839 | 6/1977 | Derown | 210/242.1 |
| 4,038,182 | 7/1977 | Jenkins | 210/DIG. 25 |
| 4,082,997 | 4/1978 | Ohtsu | 210/501 X |
| 4,091,830 | 5/1978 | Hins | 210/500.1 |
| 4,142,972 | 3/1979 | Nebeker et al. | 210/84 |

*Primary Examiner*—John Adee
*Attorney, Agent, or Firm*—Pearson & Pearson

[57] ABSTRACT

Hydrocarbons and other hazardous liquid pollutants, which are lighter than water, leaking or spilling from containers and entering the water table are intercepted by at least one deep driven, small diameter, well. The perforated casing of the well admits water. A water pump in the bottom of the casing establishes and maintains a predetermined water level below the water table level to create a cone of depression therearound, by gravity flow free of any centrifugal separation forces. The pollutant fills the cone and is periodically pumped into a recovery tank by a pump/sensor assembly supported by a winch at the level of the apex of the cone.

12 Claims, 3 Drawing Figures

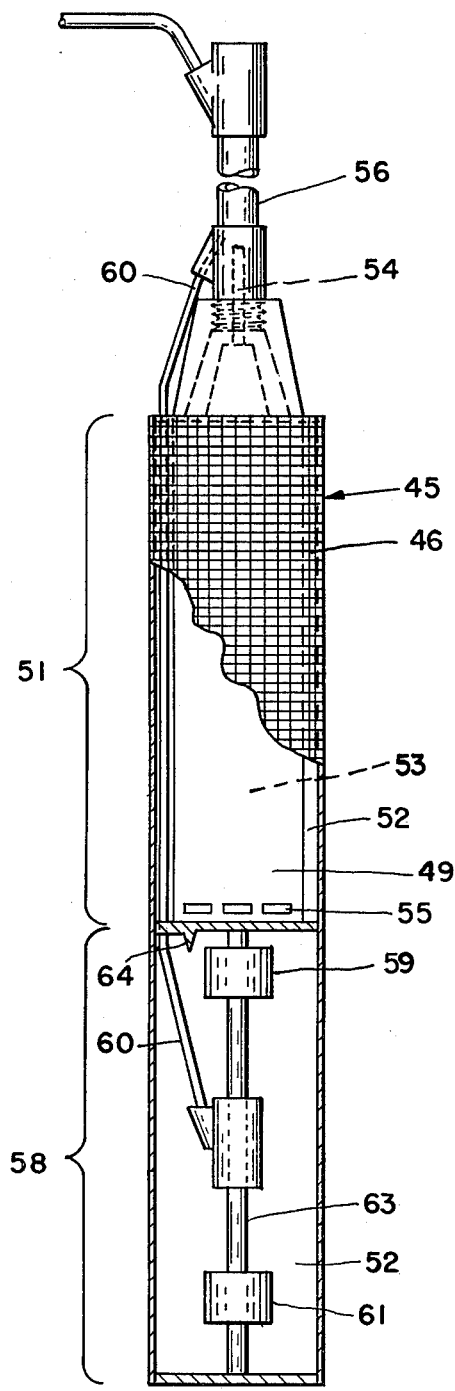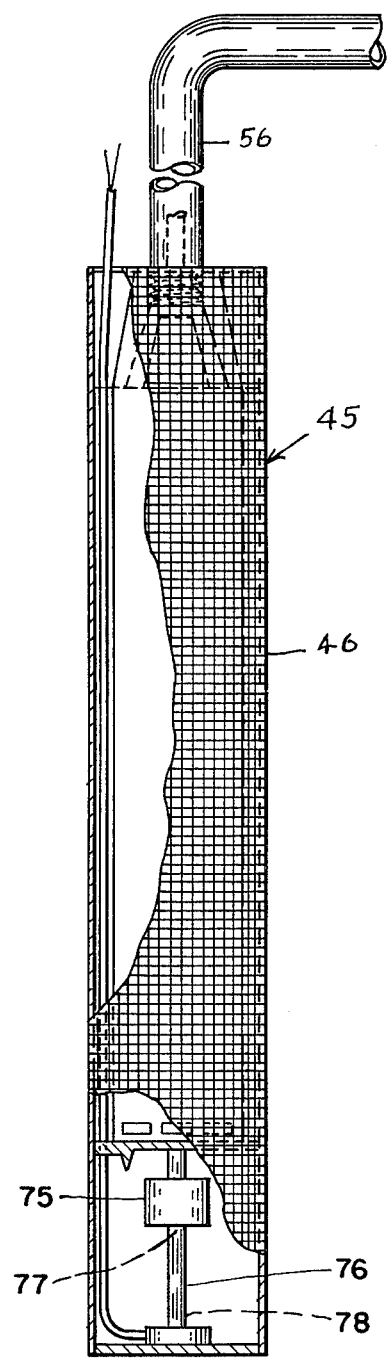
Fig. 2.
Fig. 3.

APPARATUS AND METHOD FOR RECOVERING POLLUTANT LIQUIDS

BACKGROUND OF THE INVENTION

It has heretofore been proposed to provide an oil spillage detector system in which a detector housing is disposed in partially submerged, buoyant state in a body of water. The spilled oil is collected in a chamber of the buoyant detector for indicating its presence and usually for pumping of the detected oil into a recovery container. Detectors for such systems using water-repellant, oil-passing filter material and floating or partially submerged in water are disclosed in U.S. Pat. No. 3,719,936 of Mar. 6, 1973 to Daniels et al, and in U.S. Pat. No. 4,082,997 of Apr. 4, 1978 to Ohtsu et al. A detector making use of vortical circulation for separating oil and water collected in a device floating in water is disclosed in U.S. Pat. No. 4,038,182 of July 26, 1977 to Jenkins.

The separation of oil from water in a captive environment such as while contained in containers, pipes and the like can be accomplished by known means such as in U.S. Pat. Nos. 3,742,974, 4,031,839, 4,091,830 wherein polymer imbiber materials, or oil absorbent materials are interposed into the system for the purpose.

The location, collection and recovery of liquid pollutants such as hydrocarbons, which have escaped from control by reason of spillage, or leakage into the bilge of a vessel has long presented a serious problem.

U.S. Pat. No. 4,088,579 of May 9, 1978 to Yoshioka approaches the problem of recovering oil from bilge water by pumping the bilge water from the bottom of the vessel up into a coarse separator tank, at a higher level, whereupon a layer of oil gradually builds up on the water. Within the environment of the closed pressurized container, float switch means actuates an upper oil effluent pump and a lower water effluent pump in accordance with the change of level of the oil/water interface.

None of the above mentioned prior art patents disclose a solution to the problem of locating, collecting and recovering liquid pollutants such as hydrocarbons which have spilled or leaked from above ground or underground containers to spread with the flow of groundwater down into the static water table to thereby pollute water wells and running streams or invade the cellars of buildings for an extensive area therearound.

SUMMARY OF THE INVENTION

In this invention, hydrocarbons and other liquid pollutants escaping from storage tanks, spreading through water bearing beds or stratums by the natural flow of ground water to enter the water table are intercepted by the driving of one or more deep, small diameter wells 6 to 12 inches in diameter and often to one hundred feet below ground level, in the flow path of the pollutant.

A perforated well casing is installed in the well so that water and pollutant may enter the well. A submergible water pump is located at the bottom of the well casing with a water discharge conduit leading to above ground so that the level of the water in the casing is reduced below the level of the static water table. Thus, a cone of depression which may be ten feet in depth and four hundred feet in diameter, is formed in the area around the casing to cause the pollutant to flow toward, and into, the well casing through the slots and holes therein, by gravity flow, free of centrifugal separation forces.

An elongated pollutant pump and sensor assembly is supported at a fixed height within the casing by a winch, the height, or depth, thereof being at the level of the central base of the cone of depression. As the pollutant builds up in the well casing, a lowering of the pollutant/water interface takes place. A low level point sensor in the assembly signals the electronic control circuit to actuate a pollutant pump, located in the upper portion of the assembly, to pump the collected pollutant up a conduit to a recovery tank usually at ground level. The pollutant/water interface gradually rises during the pumping until the pollutant/water interface reaches an upper level point sensor which signals the circuit to deactuate the pollutant pump.

The control circuit and float switches continue to maintain the level of the water in the well casing at the fixed level of the pollutant pump assembly while the pollutant pump operates intermittently to discharge the collected pollutant into the recovery tank until no more pollutant is present in the cone of depression.

The recovery tank is continually monitored to insure against over filling and spilling of the recovered product.

BRIEF DESCRIPTION OF THE DRAWING

FIG. 2 is an enlarged side elevation in half section of a combined pollutant pump and sensor assembly of the invention;

FIG. 3 is a view similar to FIG. 2 of another embodiment of the invention.

DESCRIPTION OF THE PREFERRED EMBODIMENT

Figure 1:
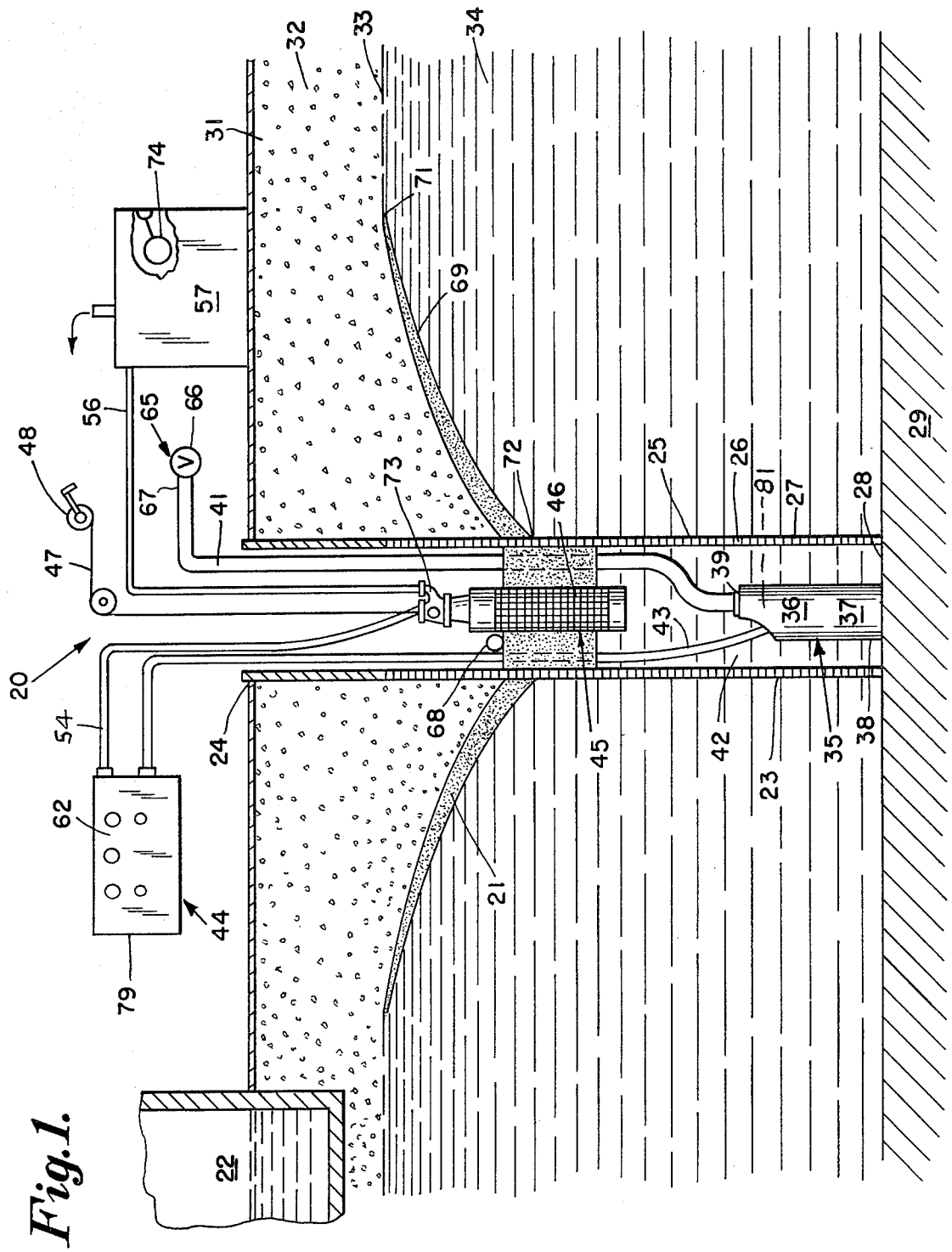
FIG. 1 is a diagramatic side elevation in section showing a perforated well casing and pollutant pump assembly of the invention installed in the path of spilled or leaked pollutant.

As shown in FIG. 1 the automatic pollutant recovery system 20 of the invention is designed and intended for recovering pollutant 21, usually a liquid hydrocarbon such as oil or gasoline, which has spilled, or leaked, from a storage tank or drum, 22.

The first step in the method of the invention is the designing and installing of a relatively deep production well 23 of small diameter, such as about ten inches, and of substantial depth, such as one hundred feet, at a point in the ground 24, determined by analysis of ground water contamination data, usually obtained by measurements of levels in observation wells. This analysis provides the desired draw down, cone of depression shape and pumping capacity required to recapture the pollutant in the well 23.

An apertured, or perforated, screen-like well casing 25 is installed in production well 23, with suitable slots, or holes 26 in the side wall 27 thereof, and extending from ground level down to below the static water table in the path of the pollutant, to pass water and pollutant through the casing into the well, and down to the bottom 28 which is usually at the level of an impervious layer 29 of ledge, rock, clay, or the like. The ground level is designated 31, with aquifer 32 extending down to the level 33 of the static water table 34. By aquifer, a water bearing bed, or stratum, of earth, gravel or porous stone is meant through which surface water and liquid pollutant flow by gravity into water table 34.

Water pump means 35 is provided including the submergible, draw down, pump 36 submerged at the bottom 28 of the well screen 25, the pump 36 having an electric drive motor 37, water intake 38, water discharge outlet 39 and water discharge conduit 41 for discharging the water 42 in the casing, above the level of the ground 31.

The drive motor 37 is electrically connected by the electric cable 43 to the controller 44, as shown.

Combined pollutant pump and sensor assembly 45 comprises the elongated, meshed, cylindrical housing 46 which may be two or three feet in length and four to six inches in diameter. Assembly 45 is supported at a predetermined height in the well casing 25 by a cable 47 and winch 48. A pollutant pump 49 is mounted in the upper portion 51 of the chamber 52, within the permeable housing 46, the pump 49 having a drive motor 53 connected by an electric cable 54 to the controller 44, inlet apertures at 55 and a pollutant discharge hose 56 leading up to ground level 31 and into a recovery tank 57.

In the preferred embodiment of FIG. 1 and FIG. 2, the lower portion 58 of chamber 52 is provided with an upper float switch 59 for sensing a high level pollutant/water interface and a lower float switch 61 for sensing a low level pollutant/water interface, both switches being connected by conductors 60 in cable 54 into a control circuit 62 of the controller 44. The float switches 59 and 61 are preferably of the magnet equipped float type moving with the liquid level to actuate a glass enclosed, hermetically sealed, reed switch within the common stem 63 to open or close the electric circuit 62. One such float switch is commercially available as The Gem, single station, liquid level, switch LS1900 made by the Gem Sensors Division of DeLaval Turbine, Inc., Farmington, Conn. 06032.

Preferably, in addition to the float switch means in the form of switches 59 and 61, an air/liquid sensor 64 is also provided in the lower portion 58 of chamber 52 to sense that air is present near the inlets 55 of pollutant pump 49 and to signal the controller 44 to deactivate the pollutant pump 49.

Water discharge control means 65 is provided which may be in the form of a manually operable shut off valve 66 at the discharge end 67 of water discharge conduit 41 to adjust water pump 36 for proper draw down. Preferably, however, the level of water in the well casing 25 is established and maintained automatically, within the desired upper and lower range determined by the position and length of chamber 58, by suitable float switches 68 in the well known manner of a sump pump.

In operation, with the water discharge control means 65, adjusted to establish and maintain the proper draw down, a cone of depression 69 is created which may be about four hundred feet in diameter at its perimeter 71 and ten or more feet in depth at its central apex 72 in the apertured, well casing 25. The elongated housing 46 of the pollutant pump and sensor assembly 45 is fixed in the well at the level of dynamic draw down once the pumping level which maintains the cone of depression is established.

The pollutants such as oil, gasoline, or other lighter then water liquids flow toward and into the well casing 25 from the cone of depression 69, by gravity, entering through the slots, or holes, 26. As the pollutant 21 builds up in the well 20, a lowering of the water/pollutant interface takes place. At the predetermined low level, the float switch sensor 61 in chamber 58 closes the circuit 62 to controller 44 which includes a source of electricity and energizes the drive motor 53 of pollutant pump 49 to pump the pollutant through hose 56 into recovery tank 57. A check valve 73 in the hose 56 prevents back flow of pollutant.

As the pollutant is pumped out, the low level pollutant/water interface gradually rises because the pressure of water pushes the pollutant upwardly until the pollutant/water interface level reaches the upper level of the float switch sensor 59 which signals the controller, through circuit 62 to deactivate the pump motor 53.

The process is continually repeated until the pollutants in the cone of depression 69 have been entirely pumped into the recovery tank 57. A suitable float switch 74 serves as a liquid level sensor in recovery tank 57, and is connected to controller 44 to deactivate the pump 49 to prevent overfill or spilling of the recovered product.

In FIG. 3 another embodiment is shown in which only one upper sensor 75 is provided, the single magnetic float 75 being vertically slidable on stem 76 and there being an upper reed switch 77 and a lower reed switch 78 within the stem 76 for activating the control circuit 62.

The apparatus of this invention is usable with any immiscible liquid pollutant which floats on water and is especially useful in recovering leakage from rusted and underground tanks of gasoline filling stations although it is equally useful in recovering leakage or spillage from tank farms, chemical plants, terminal facilities which off load tankers, etc.

A plurality of liquid level indicators may be mounted six inches apart alongside the pollutant pump 49 with a single pollutant/water interface sensor located in the lower portion 58 of compartment 52 of the pump/sensor assembly 45.

The electronic controller 44 is located in an enclosure 79, the electronic control circuit 62 using small, low current, sensing relays, capable of operating with low energy commands. Solid state relays operating in a latching mode and other associated components are located in the enclosure 79. Entrance connectors are provided for water pump AC input, water pump AC output, pollutant pump input, pollutant pump output, pump/sensor command signals and recovery tank command signals.

The air sensor 64 may be a float, buoyant in liquid, but not in air, or it may be capable of sensing the difference in electrical conductivity or thermal conductivity between air, water and pollutant, and to respond with a signal to the control circuit 62.

Instead of a system such as shown in FIG. 1 wherein the pollutant pump and sensor means is permanently located in the well to pump pollutant when pollutant accumulates at the signal of float switches in the assembly 45, under automatic control, there are installations in which a draw down pump 36 includes a built in float switch 81 (shown in dotted lines) connected to controller 44 and operable to maintain a cone of depression 69. A combined pollutant pump and sensor assembly 45, such as shown in FIG. 3, can be carried around from well to well to periodically be lowered into each well to sense the water pollutant interface by means of sensor means such as 59, 61, 64, 75, or 81 and pump out the pollutant into a suitable collection tank 57.

While float switches are preferred, and illustrated herein, which sense the different in buoyance between water and pollutant the pollutant being lighter than water, it should be understood that the sensor means 59, 61, 64 or 75 may also be sensitive to the difference in thermoconductivity of air, water, or liquid pollutant. Thus, a constant current may be imparted to flow through the sensor, the electric resistance of the sensor changing in accordance with one value for air, another value for water, and a third value for the pollutant.

Similarly the sensor means can be arranged to be responsive to changes in electrical conductivity between a pair of spaced plate electrodes, the conductivity varying depending on whether the conductor is air, water, or pollutant.

In addition, the sensors may depend on variance in the dielectric constant of the air, water or pollutant, by using capacitance sensors of a commercially available type.

By the use of such sensors an operative can lower a pump and sensor assembly 45 into a well to a considerable depth and while he cannot see what is in the well, the assembly will respond when it strikes the pollutant, water interface by pumping out the pollutant. If it strikes only water, it will not pump and it will not pump if it strikes air.

I claim:

1. An automatic, pollutant recovery system for use in recovering pollutant from a recovery well in an area known to have pollutant spilled into the ground water, said system comprising:
   an apertured, screen-like, well casing having a side wall with holes therein, extending from ground level down to substantially below the static water table to allow free movement of water and pollutants into the well;
   a submergible, draw-down, electrically powered pump submerged at the bottom of said well and having a water discharge conduit for discharging water therefrom;
   water discharge control means including said pump and a pump switch for controlling the flow of water from said well to establish and maintain by gravity flow a predetermined water level at a spaced distance below the static water table and thereby establish and maintain a cone of depression encircling said well without centrifugal separation;
   a pollutant recovery tank;
   combined pollutant pump and sensor means including an electrically powered pollutant pump, a pump switch and sensors, responsive to pollutant level to actuate said switch, supported in said well at the level of the apex of said cone of depression and at the water level maintained by said draw down pump and by said water discharge control means, for sensing a low level water/pollutant interface and energizing said pollutant pump to pump pollutant into said tank while permitting the water/pollutant interface to rise and for sensing a high level water/pollutant interface and de-energizing said pollutant pump.

2. A system as specified in claim 1 wherein:
   said combined pollutant pump and sensor means comprises an elongated, meshed, cylindrical housing of relatively small diameter enclosing said pollutant pump and sensor means suspended by a cable from a winch at the top of said well.

3. A system as specified in claim 1 plus
   a manually operable valve in said water discharge conduit for manually controlling discharge of water from said well.

4. A system as specified in claim 1 wherein:
   said water discharge control means includes a float switch in said apertured, screen-like, casing and an electric circuit including said float switch, an electric motor driving said draw down pump, and a source of electricity;
   said switch automatically energizing said motor to drive said pump and maintain a predetermined range of water levels within said well.

5. A system as specified in claim 1 wherein:
   said combined pollutant pump and sensor means includes an elongated, permeable housing having a pollutant pump in the upper portion thereof connected by a pollutant hose to said recovery tank, and float switch means in the lower portion of said housing including a lower float switch for sensing said low level oil/water interface and an upper float switch for sensing said high level oil/waer interface; and
   a control circuit including said water pump, said pollutant pump, said switch means and a source of electric current.

6. A system as specified in claim 5 wherein:
   said combined pollutant pump and sensor means includes air/liquid sensor means therewithin for sensing the presence of air at a predetermined level within said casing and responding thereto with a signal to said control circuit to deactivate said pollutant pump.

7. A system as specified in claim 5: plus
   liquid level sensing means within said recovery tank for monitoring the level of pollutant therewithin including a float switch connected to said control circuit to deactivate said pollutant pump to insure against overfill and spilling of the recovered pollutant in said tank.

8. Apparatus for automatically recovering pollutant, of the type lighter than water, which is spreading through water bearing beds, or stratums, with the natural flow of ground water into the water table said apparatus comprising:
   a perforated well casing extending from ground level down to below the static water table, in the path of said pollutant;
   a submergible water pump proximate the bottom of said casing, said pump having a discharge conduit leading to above ground level;
   water pump control means including a drive motor for said pump, a float switch within said casing and an electric control circuit including said switch and said motor for establishing and maintaining a predetermined water level range in said casing to create a cone of depression therearound;
   a pollutant recovery tank proximate the top of said well casing;
   a pollutant pump and sensor housing supported within said well casing in said predetermined water level range, said housing containing a pollutant pump in the upper portion thereof and both a high level pollutant/water interface sensing switch and a low level pollutant/water interface sensing switch in the lower portion thereof;
   and control circuit means including the drive motor of said pollutant pump, both of said pollutant/water interface sensing switches and a source of electricity for actuating said pump when said low level switch is closed and deactuating said pump when said high level switch is closed.

9. Apparatus for automatic petroleum recovery spilled into, or leaked into, the underground water table, said apparatus comprising:

at least one perforated casing, having a side wall with apertures therein, lining a deep driven well from ground level down to below the static water table, and in the path of the natural flow of ground water into said water table;

water pump means including an electrically powered, draw-down, pump in the bottom of said well casing controlled by a float switch for intermittently discharging water therefrom to establish and maintain by gravity flow, a cone of depression therearound with an apex at a predetermined level therewithin below the level of said water table;

a petroleum recovery tank;

petroleum pump and level sensing means including a petroleum pump, and level sensing switches within said casing and supported at the apex of said cone of depression, for sensing the build-up of a layer of petroleum on said water to a predetermined level, pumping said petroleum into said recovery tank and halting said pumping when said layer of petroleum is substantially pumped into said tank;

and a control circuit including the motor of said petroleum pump, said level sensing switches and a source of electricity.

10. The method of recovering lighter than water pollutants which have spilled or leaked into the water table which comprises the steps of:

driving a deep well in the path of the flow of said pollutant to a depth well below the normal level of the static water table;

pumping the water in said well from proximate the bottom thereof to maintain a cone of depression therearound, at a predetermined level so that said pollutant collects in said cone;

supporting a pollutant pump, at the level of the base of said cone of depression with the discharge thereof leading to a pollutant recovery tank;

automatically actuating said pump when the level of a layer of pollutant, supported on water at the base of said cone, reaches a predetermined low level for recovery into said tank and until said pollutant level in said well rises by water pressure and buoyancy to a higher predetermined level in said well; and automatically deactuating said pump at said higher predetermined level.

11. A combined pollutant pump and sensor assembly for use in recovering liquid pollutant from a recovery well said assembly comprising:

an elongated, housing of relatively small diameter adapted to be lowered into a production well;

said housing having a side wall with a plurality of apertures therein for admitting liquid;

said housing having a pollutant pump in the upper portion thereof, with inlet ports and a discharge conduit leading to a tank, sensor means in the lower portion thereof for sensing a water/pollutant interface and control means including an electric circuit, a pump motor and a pump sensor responsive to said sensor means for closing said circuit to actuate said pump when pollutant is sensed in said well to pump said pollutant out of said well, into said tank said sensor means not responding to the presence of water in said well.

12. A combination as specified in claim 11: plus water discharge control apparatus for controlling the flow of water from said recovery well said apparatus comprising;

a perforated casing lining the full depth of said well;

a submergible, pump located well below normal water table level in said perforated casing in said well, said pump having a discharge conduit extending therefrom up to above ground level and creating no vortical circulation in said well;

water level sensing means associated with said pump; and pump control means responsive to said water level sensing means including a drive motor for said pump for actuating said pump at a predetermined upper water level and deactuating said pump at a predetermined lower level to establish and maintain a cone of depression below said normal water table level for a substantial area around said well into which liquid pollutant collects by gravity.

* * * * *